UNITED STATES PATENT OFFICE.

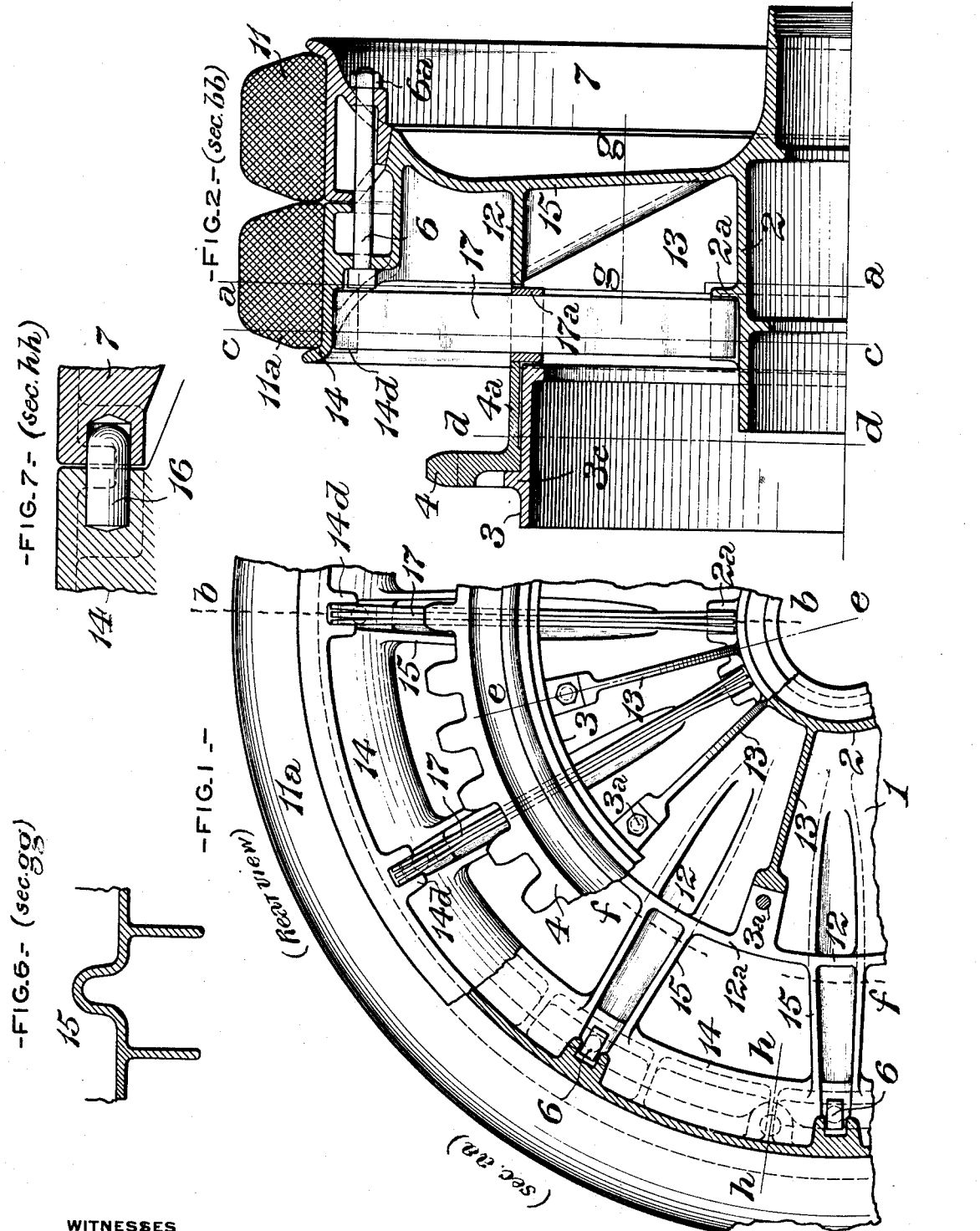

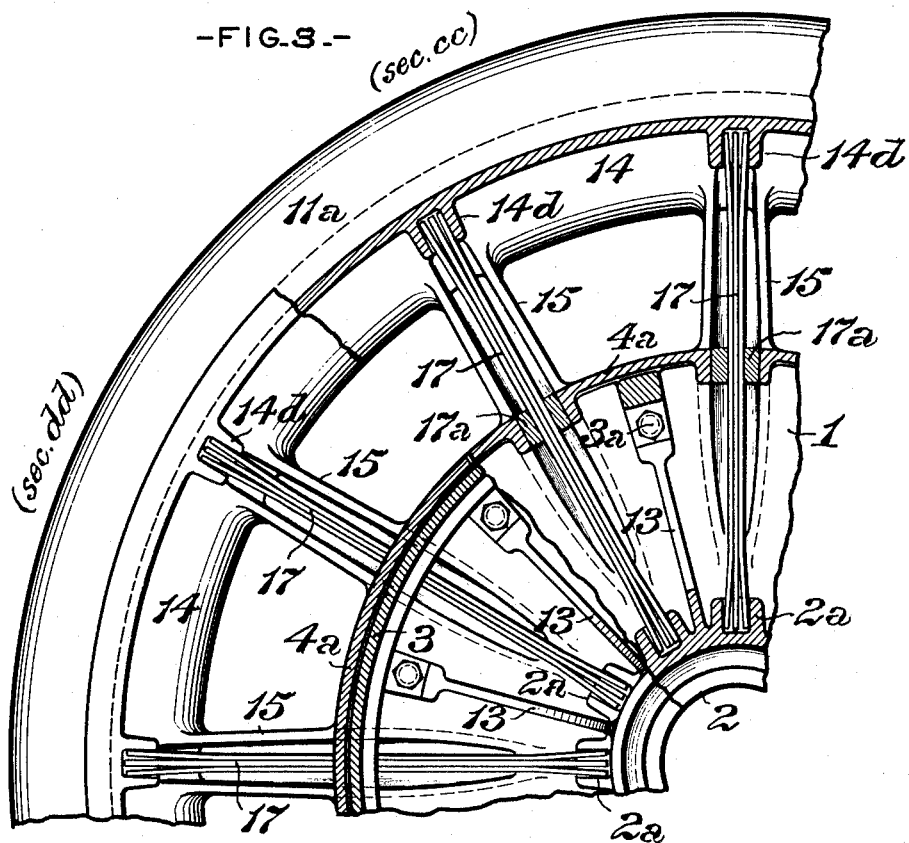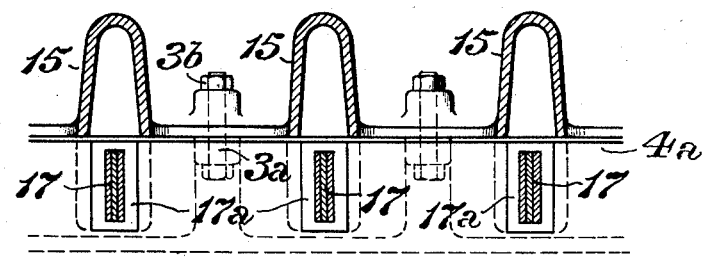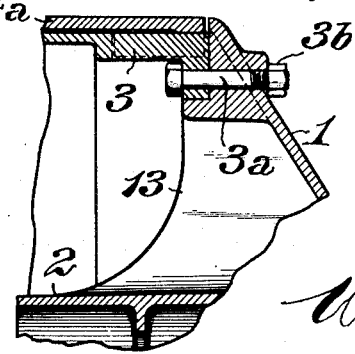

WILLIAM DALTON, OF SCHENECTADY, NEW YORK.

WHEEL FOR VEHICLES.

1,040,157.  Specification of Letters Patent.  Patented Oct. 1, 1912.

Application filed June 12, 1912. Serial No. 703,110.

*To all whom it may concern:*

Be it known that I, WILLIAM DALTON, of Schenectady, in the county of Schenectady and State of New York, have invented a certain new and useful Improvement in Wheels for Vehicles, of which improvement the following is a specification.

My invention relates to wheels for road vehicles, and more particularly to those used in automobile trucks, and its object is to provide a wheel of such class which shall be of simple, strong, and inexpensive construction, and in the operation of which, the injurious effects of jars and shocks shall be minimized by the transmission of the power by which the rotation of the wheel is effected, from the location of its application, to the contact surface of the wheel with the roadway, through the intermediation of directly and positively acting elastic driving members.

The improvement claimed is hereinafter fully set forth.

In the accompanying drawings: Figure 1 is a rear view, partly in elevation, and partly in transverse section, on the line $a\ a$ of Fig. 2, of about one fourth part of a vehicle wheel embodying my invention; Fig. 2, a longitudinal section through the same, on the line $b\ b$ of Fig. 1; Fig. 3, a view of the same character as Fig. 1, the upper portion being in section on the line $c\ c$ of Fig. 2, and the lower portion on the line $d\ d$ of the same figure; Fig. 4, a development or section on the curved line $f\ f$ of Fig. 1; Fig. 5, a partial longitudinal section on the line $e\ e$ of Fig. 1; Fig. 6, a partial section on the line $g\ g$ of Fig. 2; and Fig. 7, a section, on an enlarged scale, on the line $h\ h$ of Fig. 1.

In the practice of my invention, I provide a hub, 2, of metal, which is formed integral with the rear section, 14, of a rim, to which it is connected by a plurality of spokes, 15, of U form, in transverse section. The rim comprises the rear section, 14, which, in this instance, is illustrated as hollow or cellular, and a front section, 7, which is also shown as hollow or cellular, and is secured to the rear section by a plurality of clamping bolts, 6, set parallel with the axial line of the wheel. The hollow form of the rim sections is not, however, an essential of my invention. A dowel, 16, is fitted in recesses in the adjoining portions of the front and rear sections, to prevent independent circumferential movement thereof, and relieve strain on the clamping bolts. A pair of tires, 11, 11ª, is fitted around the rim section, in the space between their outwardly projecting side portions, said tires being readily detachable and replaceable, as desired, by the removal and replacement of the front rim section, 7.

A rearwardly extending conical flange, 1, is shown as formed on the hub, 2, said flange having a plurality of radial ribs, 13, on its inner side, and supporting a gear and brake drum, 3, which is secured to it, adjoining its periphery, by bolts, 3ª, and nuts, 3ᵇ. Ribs or bridges, 12, are cast in the spokes, 15, and form, in connection with curved bridges, 12ª, extending between the spokes, a continuous annular plate extending around the periphery of the conical flange, 1. Said flange constitutes a rear extension or enlargement of the hub, and while, structurally, it is desirably applicable in connection with my present invention, it does not, in and of itself, constitute a part thereof, and is not herein claimed as such.

A spur or sprocket driving gear, 4, to which rotation is imparted from the motor of the vehicle, through a driving chain, in the ordinary manner, is formed or fixed on a drum, 4ª, which is fitted freely, as to circumferential movement, on the drum, 3, but is prevented from moving endwise thereon by being located between an annular flange, 3ᶜ, on the drum, and the rim of the conical flange, 1. A plurality of substantially radially extending springs, 17, of plate form, is located in rear of and adjacent to the spokes, 15. The springs, 17, are preferably disposed in sets of two or more, each set being opposite the rear side of one of the spokes, and three springs being shown, in this instance, in each set. The outer ends of the springs engage the rear rim section, being fitted in socketed seats, 14ᵈ, thereon, and their inner ends engage the hub, 2, being fitted in socketed seats, 2ª, thereon. The ends of the springs of each set, or of the two outer ones thereof, when three springs are used in a set, are flexed or bent outwardly, so as to normally bear on the adjacent sides of the seats, in order to prevent rattling when not acted on by the driving gear.

Rotation is elastically transmitted from the driving gear, 4, to the wheel, through the springs, 17, which are engaged by the drum, 4ª, of the driving gear, said drum being recessed, at its inner end, to receive a plurality of rectangular spring connecting bands, 17ª, each of which fits around a set of the springs, about midway between their ends. The inner end of the brake drum, 3, which, as before explained, is fixed to the hub, is recessed correspondingly with the drum, 4, of the driving gear, the recesses of the drum, 3, being, however, of greater width, as indicated in dotted lines in Fig. 4, in order to permit free bending movement of the springs when subjected to the action of the rotative movement of the driving gear.

It will be seen that under a construction substantially as herein set forth, an elastic transmission of driving power is imparted to the wheel, with a corresponding reduction of the injurious effects of jars and shocks, and that the relation and connection of the operative members are such as to insure their positive action and enable them to be readily assembled and detached as may be required by the conditions of service.

I claim as my invention and desire to secure by Letters Patent:

1. In a vehicle wheel, the combination of a hub, a rim, a loosely mounted driving gear, and a plurality of radially disposed springs having end engagement with the hub and rim and intermediate engagement with the driving gear, to effect an elastic transmission of power from the driving gear to the wheel.

2. In a vehicle wheel, the combination of a hub, a rim, a loosely mounted driving gear, a plurality of radially disposed springs connected at their ends to the hub and rim of the wheel, and connections coupling the driving gear to the springs intermediate of their ends.

3. In a vehicle wheel, the combination of a hub, a rim, a driving gear mounted loosely on an extension of the hub, a plurality of socketed seats on the hub and rim, and a plurality of radially disposed plate springs engaging said seats at their ends, and engaging with the driving gear intermediate of their ends.

4. In a vehicle wheel, the combination of a hub, a rim, a drum fixed to and constituting an extension of the hub, a driving gear drum carrying a driving gear and mounted loosely on the hub drum, a plurality of radially disposed springs connected at their ends to the hub and rim, and connections coupling said springs, intermediate of their ends, to the driving gear drum.

5. In a vehicle wheel, the combination of a hub, a rim, a drum fixed to and constituting an extension of the hub, a driving gear drum carrying a driving gear and mounted loosely on the hub drum, a plurality of radially disposed plate springs connected at their ends to the hub and rim, and bands fitting said springs intermediate of their ends and engaging recesses in the adjacent end of the driving gear drum.

6. In a vehicle wheel, the combination of a hub, a rim, a drum fixed to and constituting an extension of the hub and having peripheral recesses at one of its ends, a driving gear drum mounted loosely on the hub drum, and having peripheral recesses adjoining those of the hub drum and of less width than the latter, a driving gear fixed to the driving gear drum, a plurality of radially disposed plate springs connected at their ends to the hub and rim, and bands fitting said springs intermediate of their ends and engaging the recesses of the driving gear drum.

7. In a vehicle wheel, the combination of a hub, a rim, spokes connecting the hub and rim, a driving gear mounted loosely on an extension of the hub, and a plurality of plate springs extending between the hub and rim, parallel with and closely in rear of the spokes, said springs engaging the hub and rim at their ends, and engaging the driving gear intermediate of their ends.

8. In a vehicle wheel, the combination of a hub, a rim, a driving gear mounted loosely on an extension of the hub, socketed seats disposed in line radially on the hub and rim, a plurality of sets of plate springs, the springs of each set engaging said seats at their ends, and connections, each coupling a set of springs intermediate of its ends, to the driving gear.

9. In a vehicle wheel, the combination of a hub, a rim, a driving wheel mounted loosely on an extension of the hub, socketed seats disposed in line radially on the hub and rim, a plurality of sets of two or more plate springs engaging said seats at their ends, the outer springs of each set being flexed or bent outwardly into contact with the sides of the seats, and connections, each coupling a set of springs, intermediate of its ends, to the driving gear.

WILLIAM DALTON.

Witnesses:
WILL W. HAMBLY,
E. I. SCHAUBER.